United States Patent
Ounsworth et al.

(10) Patent No.: US 11,930,125 B2
(45) Date of Patent: Mar. 12, 2024

(54) BINDING OF MULTIPLE HETEROGENEOUS ROOT CERTIFICATE AUTHORITIES

(71) Applicant: Entrust, Inc., Dallas, TX (US)

(72) Inventors: Michael Ounsworth, Sioux Lookout (CA); John Robert Gray, Nepean (CA); Serge Jean Maurice Mister, Ottawa (CA)

(73) Assignee: Entrust Corporation, Shakopee, MN (US)

( * ) Notice: Subject to any disclaimer, the term of this patent is extended or adjusted under 35 U.S.C. 154(b) by 57 days.

(21) Appl. No.: 17/404,572

(22) Filed: Aug. 17, 2021

(65) Prior Publication Data

US 2022/0060341 A1 Feb. 24, 2022

Related U.S. Application Data

(60) Provisional application No. 63/067,083, filed on Aug. 18, 2020.

(51) Int. Cl.
*H04L 9/32* (2006.01)
*H04L 9/08* (2006.01)

(52) U.S. Cl.
CPC .......... *H04L 9/3268* (2013.01); *H04L 9/0861* (2013.01); *H04L 9/3249* (2013.01)

(58) Field of Classification Search
CPC ... H04L 9/3268; H04L 9/0861; H04L 9/3249; H04L 9/007; H04L 9/14; H04L 9/3247; H04L 9/3265
See application file for complete search history.

(56) References Cited

U.S. PATENT DOCUMENTS 8,850,208 B1 * 9/2014 Parkinson ............ H04N 21/835
   709/225
9,112,704 B2 * 8/2015 Ignatchenko ....... G06F 21/6209
   (Continued)

FOREIGN PATENT DOCUMENTS

CN         111541727 A       8/2020

OTHER PUBLICATIONS

Kampanakis, Panos, and Dimitrios Sikeridis. "Two post-quantum signature use-cases: Non-issues, challenges and potential solutions." Proceedings of the 7th ETSI/IQC Quantum Safe Cryptography Workshop, Seattle, WA, USA. vol. 3. 2019. (Year: 2019).*

(Continued)

*Primary Examiner* — Carl G Colin
*Assistant Examiner* — Hany S. Gadalla
(74) *Attorney, Agent, or Firm* — Merchant & Gould P.C.

(57) ABSTRACT

Root certificates generated by root certificate authorities may be bound at the time of generation. In an example, a first root certificate can include an identity of a first root certificate authority, a first key identifier associated with a first key of the first root certificate authority and an identity of a first digital signature algorithm used by the first root certificate authority. The first root certificate can also include at least one extension including a second key identifier of a second key associated with the second root certificate authority and an identity of a second digital signature algorithm used by the second root certificate authority, the second digital signature algorithm being different from the first digital signature algorithm.

20 Claims, 7 Drawing Sheets

(56) References Cited

U.S. PATENT DOCUMENTS

| | | |
|---|---|---|
| 9,794,249 B1 | 10/2017 | Truskovsky et al. |
| 10,425,401 B1* | 9/2019 | Pecen ................. H04L 63/0815 |
| 2002/0026578 A1* | 2/2002 | Hamann ............... H04L 9/3263 |
| | | 713/159 |
| 2009/0259843 A1 | 10/2009 | Gentry et al. |
| 2014/0020082 A1 | 1/2014 | Leggette et al. |
| 2014/0136838 A1* | 5/2014 | Mossbarger ........ H04L 63/0823 |
| | | 713/156 |
| 2015/0256345 A1 | 9/2015 | Vaid et al. |
| 2015/0381374 A1* | 12/2015 | Zömbik ............... H04L 9/3268 |
| | | 713/158 |
| 2021/0328814 A1 | 10/2021 | Wei et al. |

OTHER PUBLICATIONS

International Search Report and Written Opinion for Application No. PCT/US2021/046346 dated Dec. 24, 2021.

* cited by examiner

X.509 Certificate -- RSA Root dn: cn=root ca, dc=entrust, dc=com
SubjectPublicKey: RSA
SubjectKeyIdentifier: 1a2b3c4d...
v3 Extensions:
 - AlternateRootKey
   alg: SPHINCS+
   keyId: 2b3c4d5e...
 - AlternateRootKey
   alg: Dilithium
   keyId: 3c4d5e6f...

502

X.509 Certificate -- SPHINCS+ Root dn: cn=root ca, dc=entrust, dc=com
SubjectPublicKey: SPHINCS+
SubjectKeyIdentifier: 2b3c4d5e...
v3 Extensions:
 - AlternateRootKey
   alg: RSA
   keyId: 1a2b3c4d...
 - AlternateRootKey
   alg: Dilithium
   keyId: 3c4d5e6f...

504

X.509 Certificate -- Dilithium Root dn: cn=root ca, dc=entrust, dc=com
SubjectPublicKey: Dilithium
SubjectKeyIdentifier: 3c4d5e6f...
v3 Extensions:
 - AlternateRootKey
   alg: RSA
   keyId: 1a2b3c4d...
 - AlternateRootKey
   alg: SPHINCS+
   keyId: 2b3c4d5e...

BINDING OF MULTIPLE HETEROGENEOUS ROOT CERTIFICATE AUTHORITIES

CROSS-REFERENCE TO RELATED APPLICATIONS

The present application claims priority from U.S. Provisional Patent Application No. 63/067,083, filed on Aug. 18, 2020, the disclosure of which is hereby incorporated by reference in its entirety.

BACKGROUND

In cryptography, a certificate authority or certification authority (CA) is an entity that issues digital certificates. A digital certificate certifies the ownership of a public key by the named subject of the certificate. This allows others (relying parties) to rely upon signatures or on assertions made about the private key that corresponds to the certified public key. A CA acts as a trusted third party—trusted both by the subject (owner) of the certificate and by the party relying upon the certificate. The format of these certificates is specified by the X.509 standard.

In this context, a root certificate is a public key certificate that identifies a root certificate authority (CA). Root certificates are self-signed and form the basis of an X.509-based public key infrastructure (PKI). Additionally, a certificate authority can issue multiple certificates in the form of a tree structure. A root certificate is the top-most certificate of the tree, the private key of which is used to "sign" other certificates. All certificates signed by the root certificate, with the "CA" field set to true, inherit the trustworthiness of the root certificate. Such a certificate is called an intermediate certificate or subordinate CA certificate. Certificates further down the tree also depend on the trustworthiness of the intermediates.

Cross certificates generally correspond to a certification of a root key of a Certificate Authority (CA) that is signed by another Certificate Authority (CA). This provides trust between the two certificate authorities in the direction of the certification. For example, a first CA sends its public key to a second CA, and the second CA generates a cross certificate by signing that public key with its own private key. Thereon, any certificates issued by the first CA will now be trusted by the second CA, or entities that trust that second CA. This may not only occur with respect to root certificates, but intermediate certificates as well.

For trust to be bidirectional, a cross certificate pair is issued, where the second CA also sends its public key to the first CA and the first CA generates a cross certificate by signing the second CA's public key with its own private key. Once this two-way key exchange and signing process is complete, the two CAs can trust each other.

However, if one of the two root keys is compromised, there is no convenient way for the other root to detect tampering. In this instance, the second (non-compromised) root would trust any forged certificates from the first root.

Traditionally, compromise of root certificates is of somewhat low risk due to the complex computational demands required to compromise a certificate constructed using RSA or elliptic curve key generation techniques. However, with improvements in computing technology, including the advent of quantum computing, the time required to compromise a certificate is expected to drastically decrease. Accordingly, alternative keying structures are being investigated. However, those alternative keying structures (e.g., PKI systems) may need to be cross-compatible with existing X.509 standard systems. Accordingly, improvements in the way in which CAs may trust each other, and detect tampering, are desired.

SUMMARY

In general, the present disclosure relates to binding of root certificates generated by root certificate authorities at the time of generation. Accordingly, shared trust across two different certificate/signature schemes may be maintained.

In a first aspect, a computer-implemented method includes generating, at a first root certificate authority from among a first root certificate authority and a second root certificate authority, a first root certificate. The first root certificate includes: an identity of the first root certificate authority; a first key identifier associated with a first key associated with the first root certificate authority and an identity of a first digital signature algorithm used by the first root certificate authority; and at least one extension including a second key identifier of a second key associated with the second root certificate authority and an identity of a second digital signature algorithm used by the second root certificate authority, the second digital signature algorithm being different from the first digital signature algorithm.

In a second aspect, a system includes a first root certificate authority comprising a first node, the first root certificate authority being configured to generate a first root certificate. The system further includes a second root certificate authority comprising a second node capable of communication with the first node, the second root certificate authority being configured to generate a second root certificate. The first root certificate includes an identity of the first root certificate authority, a first key identifier associated with a first key associated with the first root certificate authority, an identity of a first digital signature algorithm, and at least one extension including a second key identifier of a second key associated with the second root certificate authority and an identity of a second digital signature algorithm used by the second root certificate authority. The second root certificate includes an identity of the second root certificate authority, the second key identifier, an identity of a second digital signature algorithm, and at least one extension including the first key identifier and an identity of the first digital signature algorithm. The second digital signature algorithm is different from the first digital signature algorithm.

In a third aspect, a computer-implemented method includes generating, at a first root certificate authority from among a first root certificate authority and a second root certificate authority, a first root certificate. The first root certificate includes: an identity of the first root certificate authority; a first key identifier associated with a first key associated with the first root certificate authority and an identity of a first digital signature algorithm used by the first root certificate authority; and at least one extension including a second key identifier of a second key associated with the second root certificate authority and an identity of a second digital signature algorithm used by the second root certificate authority, wherein the second digital signature algorithm is a different algorithm from the first digital signature algorithm. The method further includes generating, at the second root certificate authority, a second root certificate concurrently with the first root certificate. The second root certificate includes: an identity of the second root certificate authority; the second key identifier associated with the second key associated with the second root certificate authority and an identity of the second digital signature algorithm used by the second root certificate authority; and at least one extension including the first key identifier of the first key associated with the first root certificate authority and an identity of the first digital signature algorithm used by the first root certificate authority. The method further includes generating an intermediate certificate signed by the first root certificate using the first digital signature algorithm.

DETAILED DESCRIPTION

As briefly described above, embodiments of the present invention are directed to binding of multiple root certificates to provide trust across certificate authorities having different digital signature schemes. In some examples, each root certificate authority will submit a piece of information to the other root certificate authority. The information can include, for example, an identifier of a key associated with that root certificate authority, and an identity of the digital signature algorithm used. This information can be embedded in the root certificate generated by the receiving root certificate authority to thereby bind together those root certificate authorities that exchange such information.

In accordance with the present disclosure, the addition of extensions to a root certificate binds together different certificate authorities using different digital signature schemes. This allows for flexible use of two different root certificate authorities, and two different root certificates (and corresponding certificate chains). This can allow for, for example, coexistence between two different digital signature schemes (e.g., for backwards compatibility or other reasons for coexistence).

Figure 1:
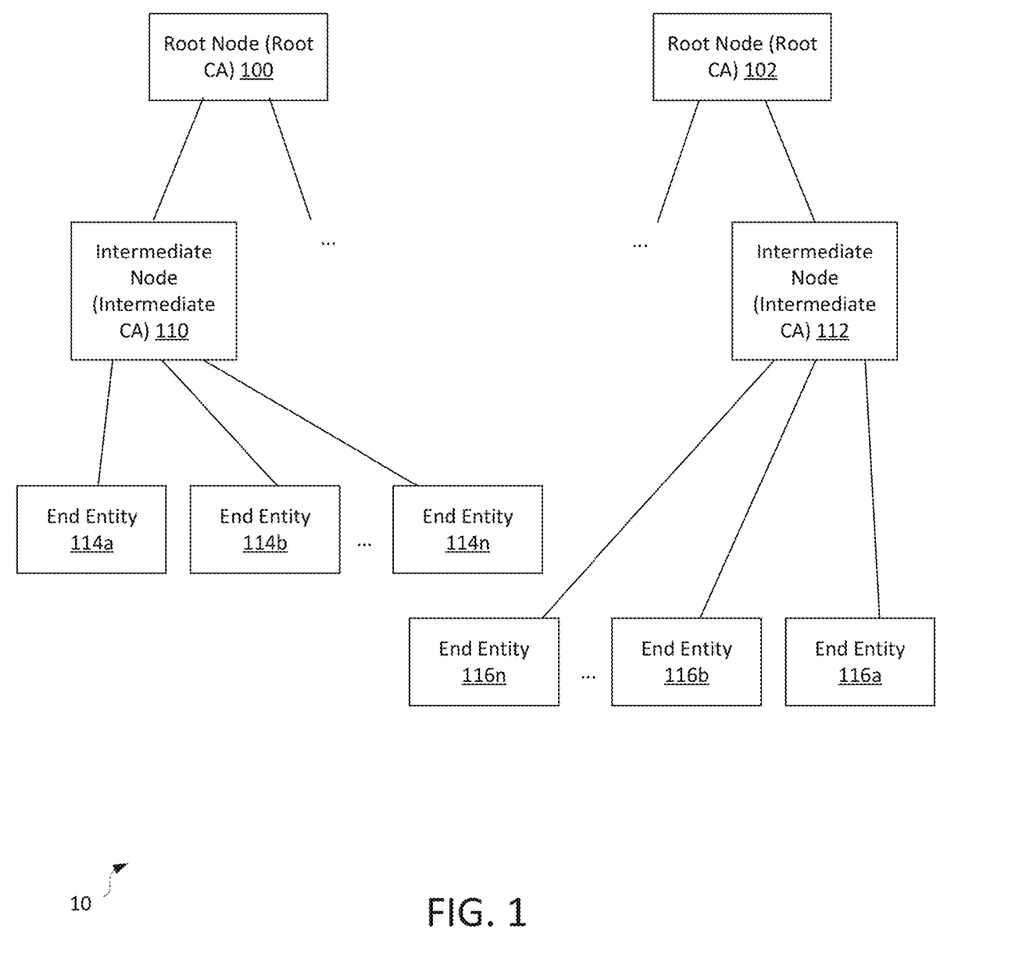
FIG. 1 illustrates an example environment in which aspects of the present disclosure may be implemented.

Referring first to FIG. 1, an example environment 10 in which aspects of the present disclosure may be implemented is shown. In the example environment 10, of a plurality of root nodes 100, 102 may be utilized. Each root node may implement a root certificate authority (CA). In other words, each root certificate authority may issue a root certificate useable within a different public key infrastructure (PKI). However, each root certificate authority may be implemented to use a different digital signature scheme. For example, a first root certificate authority at root node 100 may utilize a RSA signature scheme, while a second root certificate authority at root node 102 may utilize a different signature scheme, such as a SPHINCS+ or Dilithium (or other next-generation) digital signature scheme.

In this example, each root node 100, 102 may be associated with one or more intermediate nodes. As shown, root node 100 is associated with one or more intermediate nodes 110, and root node 102 is associated with one or more intermediate nodes 112. Intermediate nodes 110, 112 may act as intermediate certificate authorities. Additionally, intermediate nodes 110, 112 may, if acting as intermediate certificate authorities, issue certificates to one or more end entities 114a-n, 116a-n.

In this context, end entity certificates may be signed by the intermediate node, acting as intermediate certificate authority and using an intermediate certificate. Accordingly, starting at an end entity, trust chains may form back to the root node, via the end entity certificate, intermediate certificate, and root certificate. In some instances, the intermediate nodes and end entity nodes may use a same digital signature scheme as a root node. In other words, in the example shown the intermediate node 110 and end entities 114a-n can use a common signature scheme with root node 100, while intermediate node 112 and end entities 116a-n will use a common signature scheme with root node 102. In alternative embodiments, different signature mechanisms may be used by the root node 100 and intermediate node 112 may utilize different signature schemes, but will be included within the same trust chain.

As noted above, it may be that a particular enterprise or group of entities wishes to migrate from a first digital signature scheme (e.g., a first PKI system) to a second digital signature scheme (e.g., a second PKI system), while remaining within a backwards-compatible, general public key infrastructure. However this may be done gradually, such that certain nodes use an older digital signature scheme while other nodes using a newer digital signature scheme. Also, a new (and possibly untrusted) signature scheme may be introduced by an enterprise, but trust for that signature scheme has not yet been well established. Or, there may be other reasons to maintain two different schemes in parallel. In the example network 10 illustrated, validation of one end entity certificate or intermediate certificate with its root would not necessarily mean that another certificate is valid in the other digital signature scheme. Accordingly, methods and systems for binding together two digital signature schemes at the time root certificates are generated are described herein. Such binding ensures that both signature schemes must be "broken" to produce a forged certificate, thereby strengthening security for that enterprise or entities, relative to use of only one such digital signature scheme.

Figure 2:
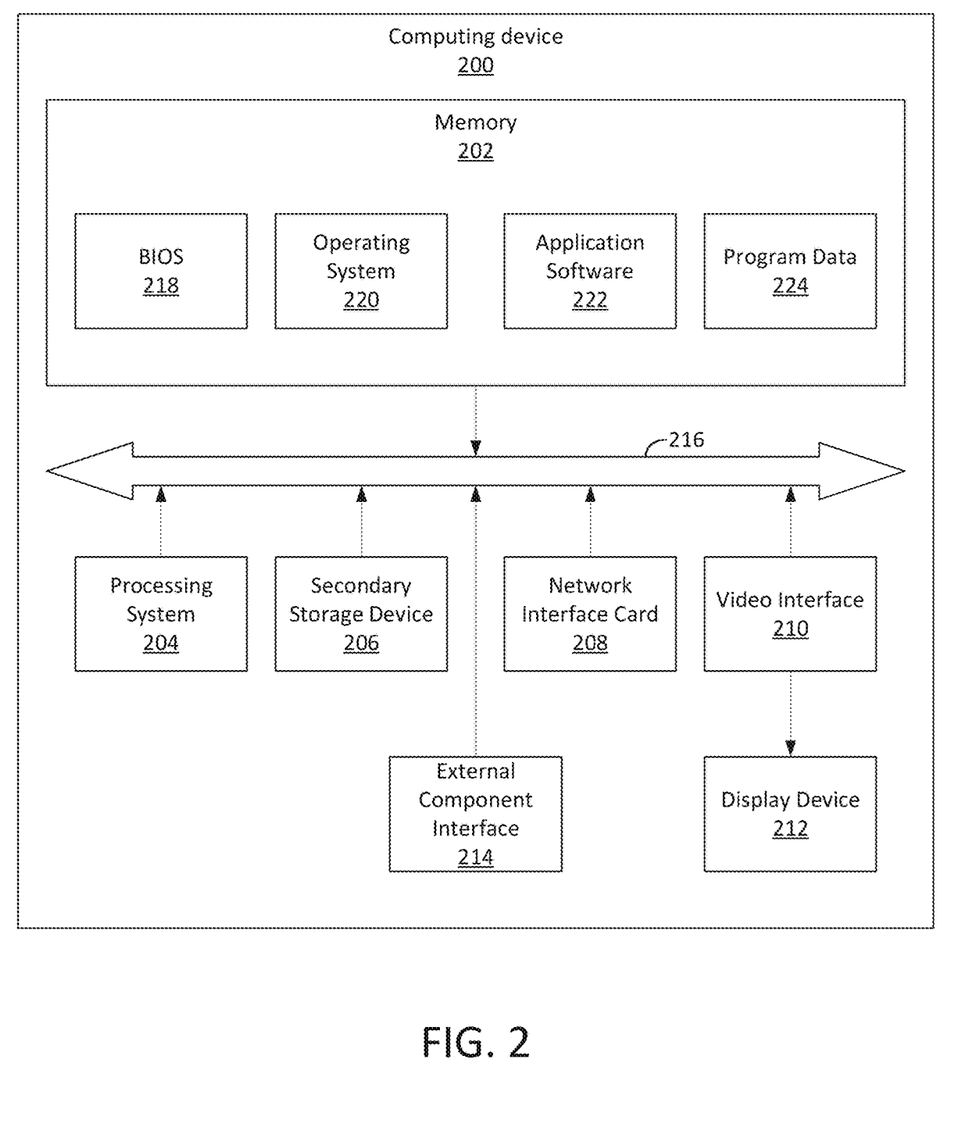
FIG. 2 illustrates an example computing device with which aspects of the present disclosure may be implemented.

FIG. 2 illustrates an example computing device 200 with which aspects of the present disclosure may be implemented. The example computing device 200 may be used to implement any individual entity or group of entities, such as the nodes 100, 102, 110, 112, 114a-n, and 116a-n described above in conjunction with FIG. 1.

In the example of FIG. 2, the computing device 200 includes a memory 202, a processing system 204, a secondary storage device 206, a network interface card 208, a video interface 210, a display unit 212, an external component interface 214, and a communication medium 216. The memory 202 includes one or more computer storage media capable of storing data and/or instructions. In different embodiments, the memory 202 is implemented in different ways. For example, the memory 202 can be implemented using various types of computer storage media, and generally includes at least some tangible media. In some embodiments, the memory 202 is implemented using entirely non-transitory media.

The processing system 204 includes one or more processing units, or programmable circuits. A processing unit is a physical device or article of manufacture comprising one or more integrated circuits that selectively execute software instructions. In various embodiments, the processing system 204 is implemented in various ways. For example, the processing system 204 can be implemented as one or more physical or logical processing cores. In another example, the processing system 204 can include one or more separate microprocessors. In yet another example embodiment, the processing system 204 can include an application-specific integrated circuit (ASIC) that provides specific functionality. In yet another example, the processing system 204 provides specific functionality by using an ASIC and by executing computer-executable instructions.

The secondary storage device 206 includes one or more computer storage media. The secondary storage device 206 stores data and software instructions not directly accessible by the processing system 204. In other words, the processing system 204 performs an I/O operation to retrieve data and/or software instructions from the secondary storage device 206. In various embodiments, the secondary storage device 206 includes various types of computer storage media. For example, the secondary storage device 206 can include one or more magnetic disks, magnetic tape drives, optical discs, solid-state memory devices, and/or other types of tangible computer storage media.

The network interface card 208 enables the computing device 200 to send data to and receive data from a communication network. In different embodiments, the network interface card 208 is implemented in different ways. For example, the network interface card 208 can be implemented as an Ethernet interface, a token-ring network interface, a fiber optic network interface, a wireless network interface (e.g., WiFi, WiMax, etc.), or another type of network interface.

In optional embodiments where included in the computing device 200, the video interface 210 enables the computing device 200 to output video information to the display unit 212. The display unit 212 can be various types of devices for displaying video information, such as an LCD display panel, a plasma screen display panel, a touch-sensitive display panel, an LED screen, a cathode-ray tube display, or a projector. The video interface 210 can communicate with the display unit 212 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 214 enables the computing device 200 to communicate with external devices. For example, the external component interface 214 can be a USB interface, a FireWire interface, a serial port interface, a parallel port interface, a PS/2 interface, and/or another type of interface that enables the computing device 200 to communicate with external devices. In various embodiments, the external component interface 214 enables the computing device 200 to communicate with various external components, such as external storage devices, input devices, speakers, modems, media player docks, other computing devices, scanners, digital cameras, and fingerprint readers.

The communication medium 216 facilitates communication among the hardware components of the computing device 200. The communications medium 216 facilitates communication among the memory 202, the processing system 204, the secondary storage device 206, the network interface card 208, the video interface 210, and the external component interface 214. The communications medium 216 can be implemented in various ways. For example, the communications medium 216 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 202 stores various types of data and/or software instructions. The memory 202 stores a Basic Input/Output System (BIOS) 218 and an operating system 220. The BIOS 218 includes a set of computer-executable instructions that, when executed by the processing system 204, cause the computing device 200 to boot up. The operating system 220 includes a set of computer-executable instructions that, when executed by the processing system 204, cause the computing device 200 to provide an operating system that coordinates the activities and sharing of resources of the computing device 200. Furthermore, the memory 202 stores application software 222. The application software 222 includes computer-executable instructions, that when executed by the processing system 204, cause the computing device 200 to provide one or more applications. The memory 202 also stores program data 224. The program data 224 is data used by programs that execute on the computing device 200.

Although particular features are discussed herein as included within an electronic computing device 200, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

It is noted that, in some embodiments of the computing device 200 of FIG. 2, the computer-readable instructions are stored on devices that include non-transitory media. In particular embodiments, the computer-readable instructions are stored on entirely non-transitory media.

Figure 3:
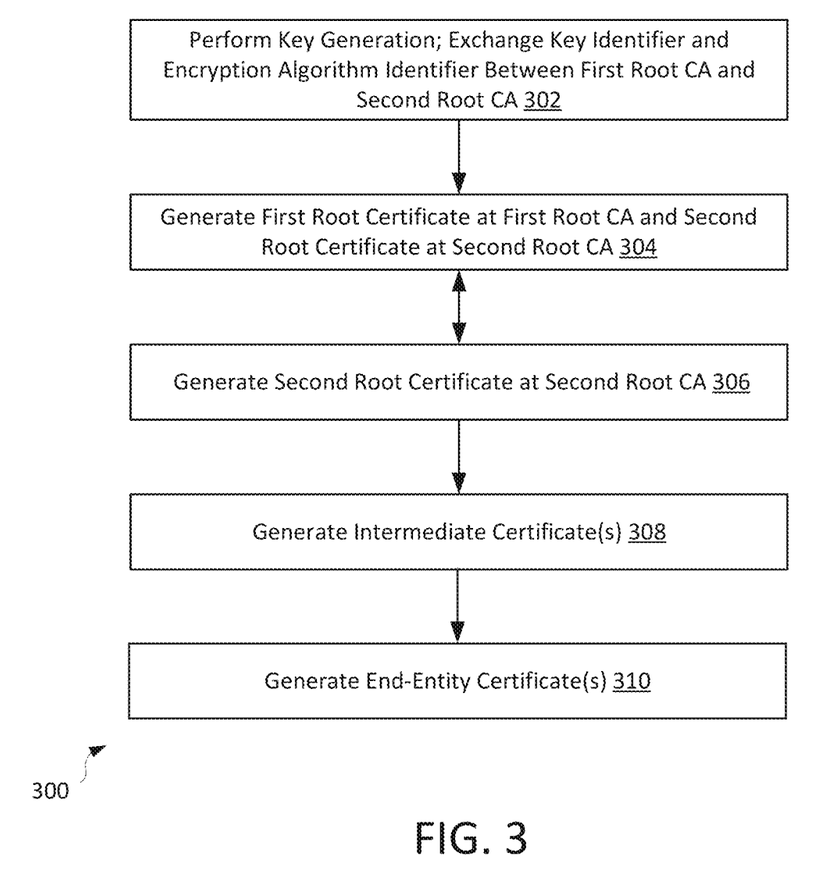
FIG. 3 is a flowchart of an example method of generating and binding root certificates across two different root certificate authorities, according to an example embodiment.

FIG. 3 is a flowchart of an example method 300 of generating and binding root certificates across two different root certificate authorities, according to an example embodiment. The method 300 can be performed, for example, by two root certificate authorities, such as the two root notes 100, 102 of FIG. 1.

In the example shown, the method 300 includes performing key generation at the first root certificate authority 100 and second root certificate authority 102 (step 302). At the time of key generation, each key will be associated with a particular key identifier, and may be generated for use with a particular digital signature scheme. Accordingly, the first root certificate authority will generate a first key or keys (e.g., public/private key pair) for use with a first scheme, and that key will be associated with a particular key identifier. Concurrently, the second root certificate authority will generate a second key or keys for use with the second scheme, and that second key will be associated with a different key identifier. The first and second root certificate authorities then exchange the key identifier and information identifying the digital signature algorithm used at that respective certificate authority.

In the example shown, the method 300 further includes generating a first root certificate at the first root certificate authority (step 304). The method 300 further can include generating a second root certificate at the second root certificate authority. In particular, the first root certificate is bound to the second root certificate authority, and the second root certificate is bound to the first root certificate authority. This is accomplished by, for example, storing an extension in each generated root certificate that includes identifying information of any other bound root certificates. For example, the first root certificate generated by the first root certificate authority may be bound to the second root certificate authority by including within the first root certificate traditional information, such as an identity of the first root certificate authority, a key identifier associated with a first key generated by the first root certificate authority, a signature algorithm used by the certificate, a date of issuance and expiration, and various policy settings for the certificate.

The first root certificate may further include one or more extensions. The one or more extensions may include an extension that includes a second key identifier associated with the second key that is generated by the second root certificate authority. The extension a further include an identity of a second digital signature algorithm used by the second root certificate authority. That second digital signature algorithm may be different, for example, from the digital signature algorithm used by the first root certificate authority.

In the example shown, the method 300 further includes generating a second root certificate at the second root certificate authority (step 306). This may occur, for example, concurrently with generating the first root certificate at the first root certificate authority. Generating the second root certificate may include, for example, binding the second root certificate to the first root certificate authority by storing a second extension in the second root certificate that includes identifying information of the first root certificate authority. As above, the second root certificate may include typical information such as an identity of the second root certificate authority, a key identifier of a second key generated by the second root certificate authority, a signature algorithm used by the second certificate, a date of issuance and expiration, and various policy settings for the certificate. As with the first certificate, the second certificate can include an extension that includes a first key identifier associated with the first key that is generated by the first root certificate authority, as well as an identity of a first digital signature algorithm used by the first root certificate authority. Accordingly, at the time of generation of the first and second root certificates, those root certificates will include information unique to the other root certificates that are generated concurrently. In this way, the root certificates may be bound together.

In some embodiments, the method 300 may further include generating one or more intermediate certificates (step 308) and/or generating one or more end entity certificates (step 310). In various embodiments generating the intermediate certificates may occur on the root nodes, and the intermediate certificates are routed to intermediate certificate authorities. Additionally, end entity certificates may be issued by that intermediate certificate authority. intermediate certificates may be signed using a key of a corresponding root certificate, and the end entity certificate may be signed by the key contained within the intermediate certificate. Accordingly, each intermediate certificate that is generated may implement one of the digital signature schemes implemented by a root certificate authority. Similarly, end entity certificates will be signed by the intermediate certificate authority using the key contained within the intermediate certificate.

In some embodiments, once root certificates are bound together using the method described above, intermediate certificates and end entity certificates may be issued to any of a variety of types of devices or systems. In some instances, two different certificates may be issued to the same node that is acting as the intermediate certificate authority or the end entity. In such cases, the device receiving two different certificates may selectively utilize one or the other of the certificates as migration between two different certificate authorities, and therefore potentially two different digital signature schemes, occurs.

Additionally, it is noted that although the method 300 is discussed with respect to two different root certificate authorities, the method may be extended for use with three or more different root certificate authorities.

Figure 4:
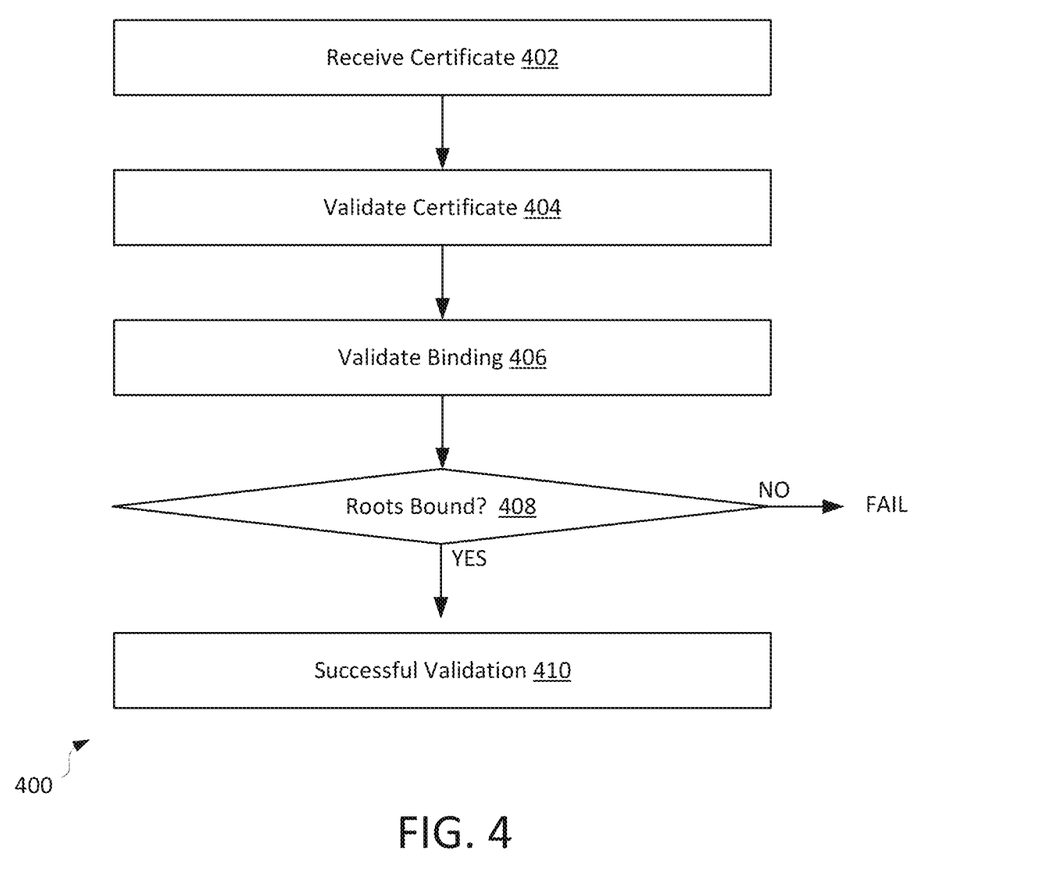
FIG. 4 is a flowchart of an example method of validating intermediate and end entity certificates used in conjunction with bound root certificates.

Referring now to FIG. 4, an example method 400 is shown for validating intermediate and end entity certificates used in conjunction with bound root certificates. In the example shown, a certificate is received that is to be validated (step 402). This can include, for example, receiving a certificate from an end entity or from an intermediate certificate authority.

The method further includes validating the certificate (step 404). Validating the certificate may include traditional operations such as reviewing the certificate to determine the issuer of the certificate (e.g., the intermediate certificate authority, in the case of an end entity certificate) and optionally reviewing the intermediate certificate associated with the issuer to determine an issuer of that intermediate certificate, for example according to the validation rules in RFC 5280. Validating the certificate (e.g., the end entity certificate) can include validating the end entity certificate validity based on (1) it having valid dates, and (2) being signed by a valid intermediate certificate, and validating the intermediate certificate by (1) it having valid dates and (2) being signed by a valid root certificate.

In the example shown, the method 400 further includes validating a binding between two root certificates (step 406). Validating the binding between two root certificates may include assessing at the root certificate that is associated with the certificate being validated whether an extension exists that corresponds to another root certificate.

If such an extension is present, it can be determined that the certificate being validated is chained to a root certificate that was cross-bound to the second certificate at the time of key generation. Accordingly, at operation 408, the binding is determined to be valid, and validation is determined to be successful (step 410). However, if the roots are not bound, for example by the first root certificate storing an invalid key identifier of a second key associated with a second root certificate, validation may fail despite the original certificate being correctly chained to a root certificate. In that instance, the root certificates may optionally be considered invalid, and root, intermediate, and end entity certificates may be regenerated and redistributed to corresponding nodes.

Figure 5:
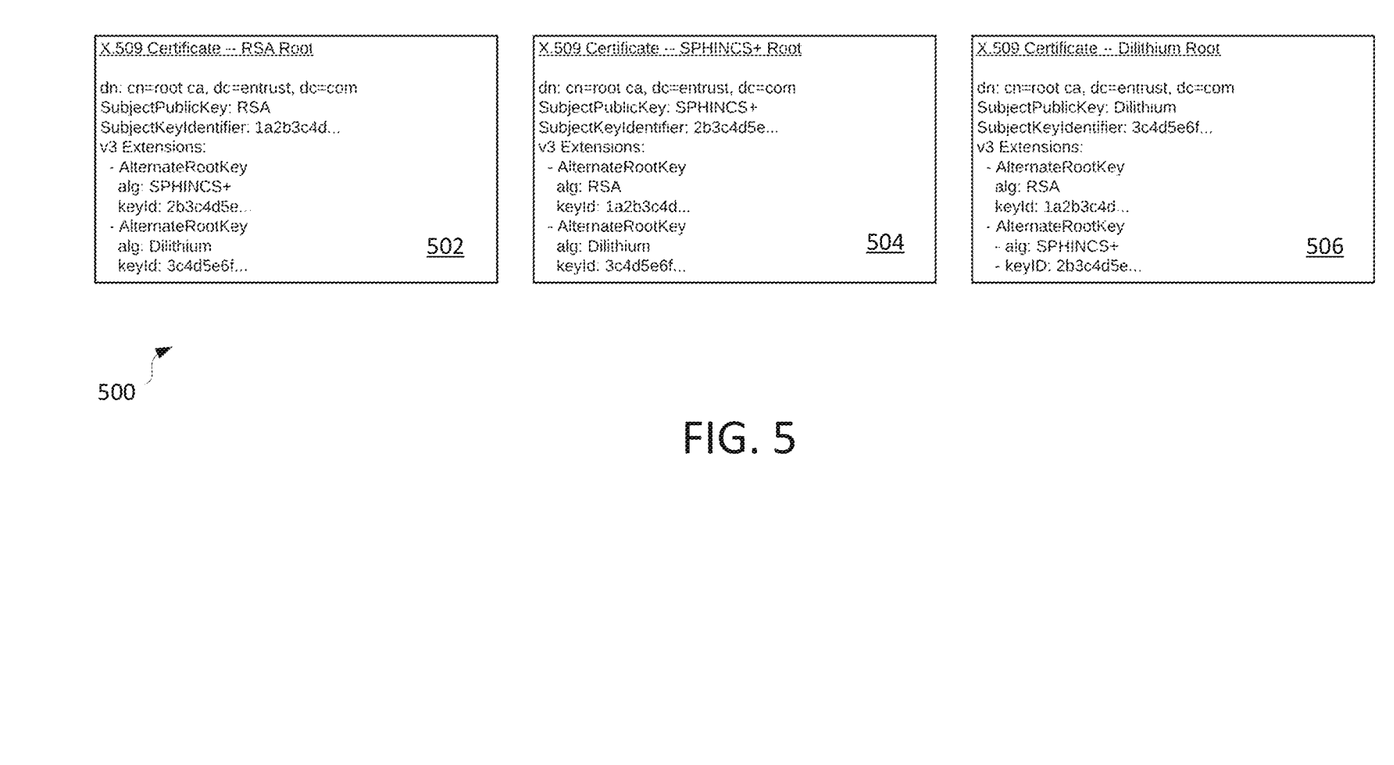
FIG. 5 illustrates a set of bound root certificates, according to an example embodiment.

Referring now to FIG. 5, a set 500 of bound root certificates is shown according to an example embodiment. In the example shown root certificates 502, 504, 506 are generated concurrently. Root certificate 502 as shown is an X.509 certificate that implements RSA-based digital signatures. As illustrated, the root certificate 502 includes issuer information, shown as an identity of the root certificate authority (in this case, issued from entrust.com). The root certificate 502 identifies its public key as using RSA signature chain, and includes a key identifier for the key associated with that root certificate. Additionally, a plurality of extensions are shown. In this case, two additional extensions are included in the root certificate 502, one for each other cross-bound certificate 504, 506. As illustrated, each of the additional extensions identifies an alternate root key, meaning that an alternate root is bound to the current root. The extensions each also include a key identifier associated with the alternate root key, as well as a digital signature algorithm associated with those alternate root keys. In the example shown, a first alternate root key is identified as being associated with a SPHINCS+-based algorithm (associated with root certificate 504) and a second alternate root key is identified as using a Dilithium-based algorithm (associated with root certificate 506).

Similarly, during the concurrent creation of root certificates 504, 506, each of the certificates may include, for example, the root certificate authority identity, digital signature algorithm, and key identifier, as well as corresponding extensions associate with the others of the root certificates (extensions associated with certificates 502, 506 in root certificate 504, and extensions associated with certificates 502, 504 in root certificate 506). Accordingly, the validation of a certificate chain that includes any of the root certificates allows for validation of the binding between the certificates 502, 504, 506.

Although not shown, additional information may be included in the root certificates 502, 504, 506, such as validity information, policy information, or other extensions.

Although, in the embodiment shown, an RSA signature chain and SPHINCS+-based or Dilithium-based signatures are described, the present disclosure is not so limited. Rather, any of a variety of digital signature algorithms may be used, including, but not limited to, an RSA-based algorithm; a ECC-based algorithm, a CRYSTALS-DILITHIUM-based algorithm, a FALCON-based algorithm, a GeMSS based algorithm, an HSS based algorithm, a LUOV based algorithm, a MQDSS based algorithm, a Picnic based algorithm, a qTESLA based algorithm, a Rainbow based algorithm, a SPHINCS+ based algorithm, an XMSS based algorithm, or any other digital signature algorithm. Such algorithms may be used in any of the root certificates.

Figure 6:
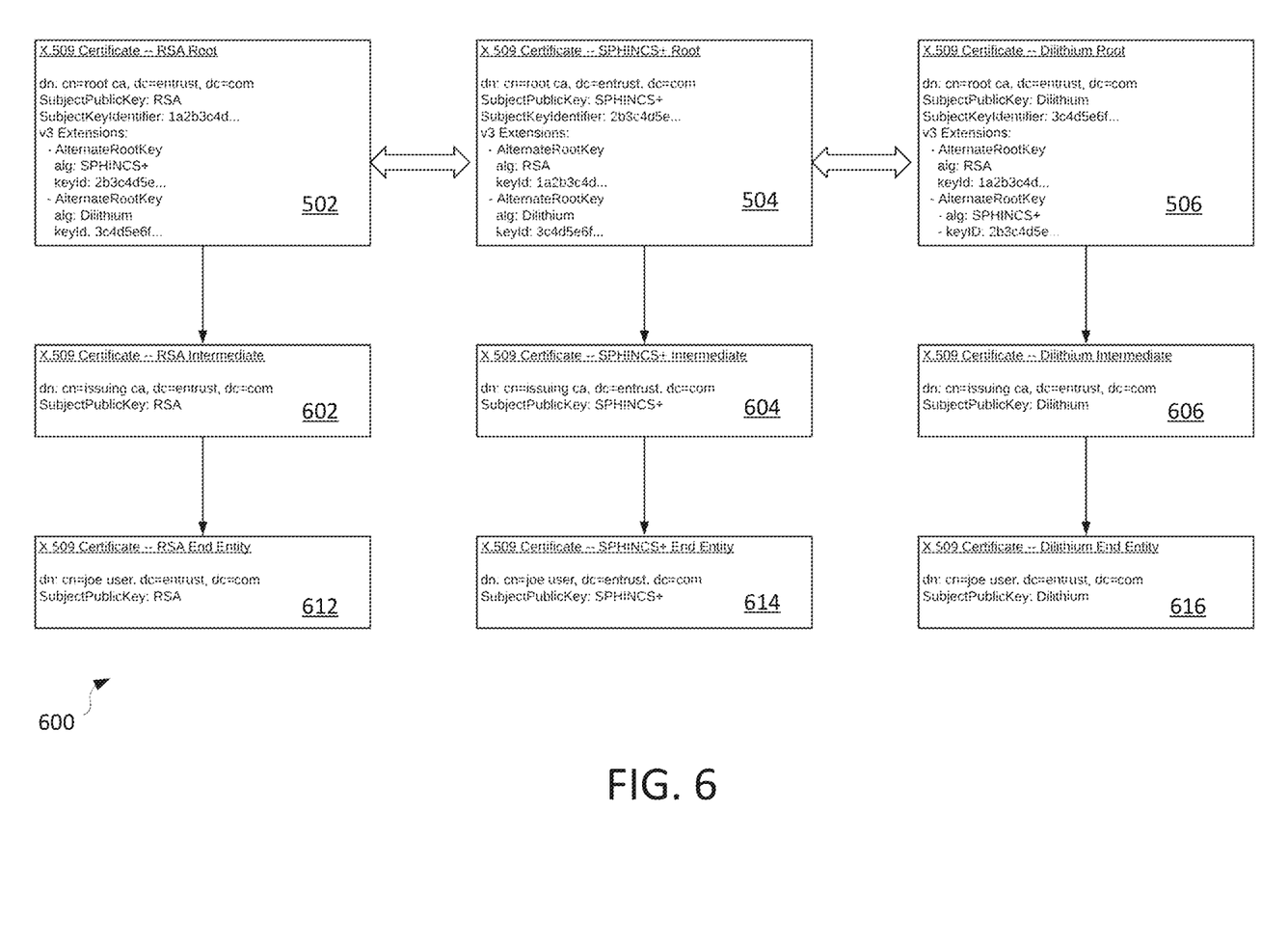
FIG. 6 illustrates a set of bound root certificates and related intermediate and end-entity certificates, according to an example embodiment.

Referring now to FIG. 6, a set 600 of bound root certificates and related intermediate and end-entity certificates are shown, according to an example embodiment. In this example the root certificates 502, 504, 506 generally correspond to those seen in FIG. 5. However, in this example, intermediate certificates 602, 604, and 606 are issued and signed by corresponding root certificates 502, 504, and 506, respectively. Additionally, end entity certificates 612, 614, and 616, are issued, each of which being signed by a corresponding intermediate certificate 602, 604, 606, respectively.

In this arrangement, it can be seen at the intermediate certificates 602, 604, 606 do not include additional extensions which identify root certificates other than the root certificate that signed the corresponding intermediate certificate. Similarly, end entity certificates 612, 614, 616 also are not required to store information, such as the extensions identifying the other root certificates outside of that end entity's certificate chain. As shown, each of the intermediate certificates 602, 604, 606 stores information about the issuing certificate authority and digital signature algorithm used. Similarly, end entity certificates 612, 614, 616 may include an identification of the end-entity, as well as an identification of the certificate issuer and/or the signing certificate, as well as the digital signature scheme used. Notably, the intermediate certificates and end entity certificates you do not require use of extensions that identify the other possible digital signature mechanisms and root certificates that are bound to the chained root certificate. Rather, the data binding may be validated via the root certificate when the certificate chain is validated.

Figure 7:
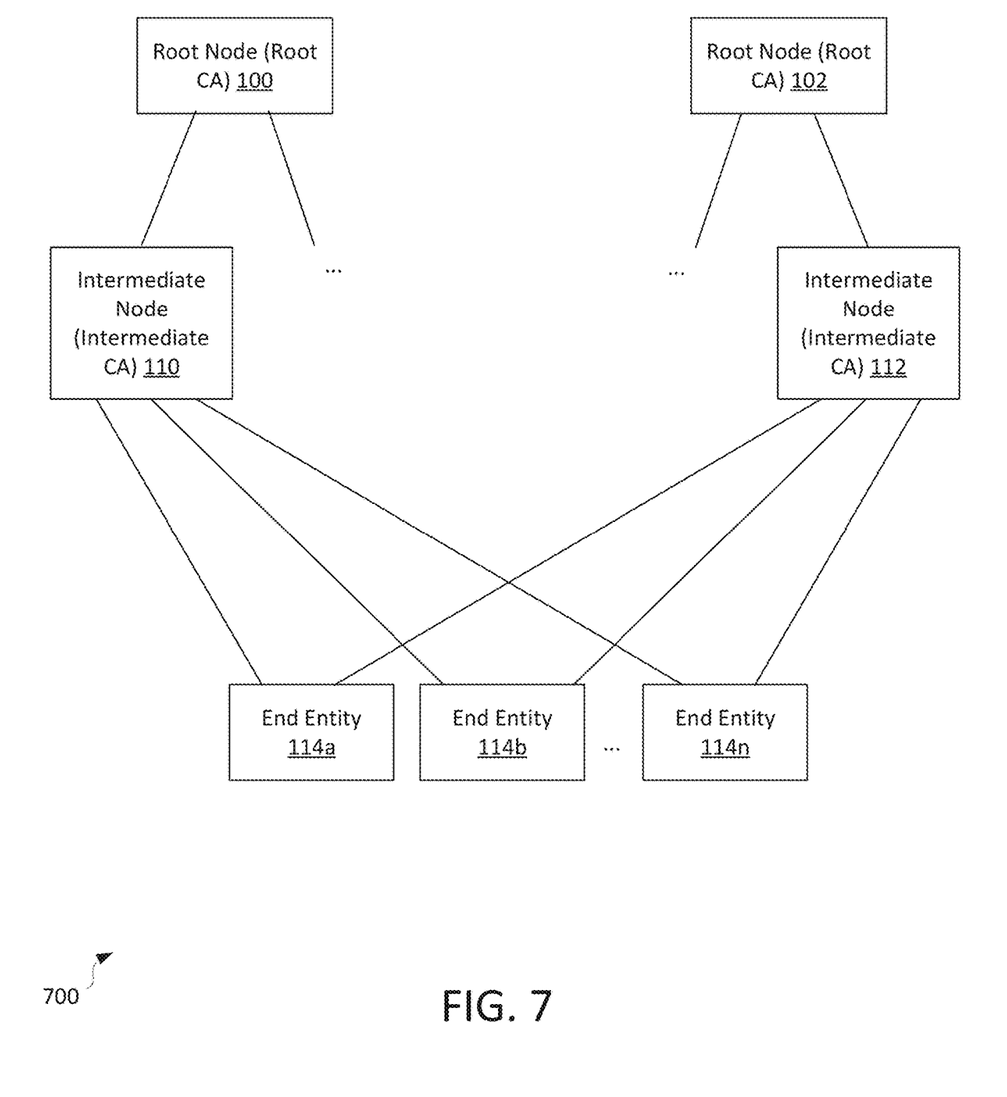
FIG. 7 illustrates an example environment implementing bound root certificates according to an example embodiment.

FIG. 7 illustrates an example environment 700 implementing bound root certificates according to an example embodiment. The example environment 700 generally includes the same entities as noted above in FIG. 1. However, in this case end entities may be issued two different end entity certificates, each signed by a different intermediate certificate. Accordingly, each end entity may have the option to validate a particular operation based on either end-entity certificate, or in some cases both end entity certificates. It is noted that although intermediate nodes 110, 112 are shown as separate intermediate devices that implement different intermediate certificate authorities, in some embodiments two different intermediate certificate authorities may be implemented on a same node. Additionally, although two different root certificate authorities on two different root nodes are shown, in some example embodiments the different root certificate authorities may be implemented on a common root node. This may be the case, for example, where concurrent digital signature schemes and key infrastructures are used across a common network, e.g., for migration from a first digital signature scheme to a second digital signature scheme within a particular network.

Referring to FIGS. 1-7, in accordance with aspects of the present disclosure, it is noted that the present disclosure has a number of advantages over existing systems. For example, the above scheme may be used to create identical copies of every entity in a given public key infrastructure (PKI)) across all the "sister" PKIs, and thus accomplish giving each entity multiple keys in a cryptographically sound way since it can be verified that all entity certificates chain to roots that were cross-bound at the time keys were generated. Such an arrangement is seen at the end entity in FIG. 7, but could be extended to the intermediate certificate authorities and/or root certificate authorities as well. Additionally, this binding can be accomplished within the context of existing X.509 standards, ensuring compatibility between formats of certificates of the bound PKI systems. Other advantages are presented by the present disclosure is well as reflected above and in the appended claims.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

The invention claimed is:

1. A computer-implemented method comprising:
generating, at a first root certificate authority from among a first root certificate authority and a second root certificate authority, a first root certificate, the first root certificate including:
an identity of the first root certificate authority;
a first key identifier associated with a first key associated with the first root certificate authority and an identity of a first digital signature algorithm used by the first root certificate authority; and
at least one extension including a second key identifier of a second key associated with the second root certificate authority and an identity of a second digital signature algorithm used by the second root certificate authority, the second digital signature algorithm being different from the first digital signature algorithm.

2. The computer-implemented method of claim 1, further comprising:
generating, at the second root certificate authority, a second root certificate, the second root certificate including:
an identity of the second root certificate authority;
the second key identifier associated with the second key associated with the second root certificate authority and an identity of the second digital signature algorithm used by the second root certificate authority; and
at least one extension including the first key identifier of the first key associated with the first root certificate authority and an identity of the first digital signature algorithm used by the first root certificate authority.

3. The computer-implemented method of claim 2, wherein generating the first root certificate and the second root certificate occur concurrently at the first root certificate authority and the second root certificate authority, respectively.

4. The computer-implemented method of claim 2, further comprising:
generating, at each of a plurality of third root certificate authorities, a third root certificate, the third root certificate including:
an identity of the third root certificate authority;
a third key identifier associated with a third key associated with the third root certificate authority and an identity of a third digital signature algorithm used by the respective third root certificate authorities;
a first extension including the first key identifier of the third key associated with the first root certificate authority and the identity of the first digital signature algorithm used by the first root certificate authority;
a second extension including the second key identifier of the second key associated with the second root certificate authority and the identity of the second digital signature algorithm used by the second root certificate authority; and
one or more third extensions corresponding to others of the third root certificate authorities.

5. The computer-implemented method of claim 1, wherein the first root certificate and the second root certificate comprise X.509 certificates.

6. The computer-implemented method of claim 1, wherein the first digital signature algorithm is selected from a group of digital signature algorithms consisting of: an RSA-based algorithm; a ECC-based algorithm, a CRYSTALS-DILITHIUM-based algorithm, a FALCON-based algorithm, a GeMSS based algorithm, an HSS based algorithm, a LUOV based algorithm, a MQDSS based algorithm, a Picnic based algorithm, a qTESLA based algorithm, a Rainbow based algorithm, a SPHINCS+ based algorithm, and an XMSS based algorithm.

7. The computer-implemented method of claim 1, further comprising generating an intermediate certificate chained to a root certificate, the root certificate being selected from among the first root certificate and the second root certificate.

8. A system comprising:
a first root certificate authority comprising a first node, the first root certificate authority being configured to generate a first root certificate;
a second root certificate authority comprising a second node capable of communication with the first node, the second root certificate authority being configured to generate a second root certificate;
wherein:
the first root certificate includes an identity of the first root certificate authority, a first key identifier associated with a first key associated with the first root certificate authority, an identity of a first digital signature algorithm, and at least one extension including a second key identifier of a second key associated with the second root certificate authority and an identity of a second digital signature algorithm used by the second root certificate authority;
the second root certificate includes an identity of the second root certificate authority, the second key identifier, an identity of a second digital signature algorithm, and at least one extension including the first key identifier and an identity of the first digital signature algorithm; and
the second digital signature algorithm is different from the first digital signature algorithm.

9. The system of claim 8, wherein the first root certificate authority is communicatively connected to the second root certificate authority.

10. The system of claim 8, wherein the first root certificate authority is configured to generate the first root certificate concurrently with the second root certificate authority generating the second root certificate.

11. The system of claim 8, wherein the identity of the first root certificate authority includes a name of an issuer of the first root certificate.

12. The system of claim 8, wherein the first root certificate further includes a validity period.

13. The system of claim 8, wherein the first root certificate and the second root certificate comprise X.509 certificates.

14. The system of claim 8, further comprising a third node associated with an intermediate certificate signed by the first root certificate, the third node using the first digital signature algorithm.

15. The system of claim 14, further comprising an end-entity certificate that is signed by the intermediate certificate.

16. The system of claim 15, wherein the end-entity certificate is issued by the third node.

17. A computer-implemented method comprising:
generating, at a first root certificate authority from among a first root certificate authority and a second root certificate authority, a first root certificate, the first root certificate including:
an identity of the first root certificate authority;
a first key identifier associated with a first key associated with the first root certificate authority and an identity of a first digital signature algorithm used by the first root certificate authority; and
at least one extension including a second key identifier of a second key associated with the second root certificate authority and an identity of a second digital signature algorithm used by the second root certificate authority, wherein the second digital signature algorithm is a different algorithm from the first digital signature algorithm;
generating, at the second root certificate authority, a second root certificate, the second root certificate being generated concurrently with the first root certificate and including:
an identity of the second root certificate authority;
the second key identifier associated with the second key associated with the second root certificate authority and an identity of the second digital signature algorithm used by the second root certificate authority; and
at least one extension including the first key identifier of the first key associated with the first root certificate authority and an identity of the first digital signature algorithm used by the first root certificate authority; and
generating an intermediate certificate signed by the first root certificate using the first digital signature algorithm.

18. The computer-implemented method of claim 17, wherein the first root certificate authority is implemented on a first node and the second root certificate authority is implemented on a second node communicatively coupled to the first node.

19. The computer-implemented method of claim 17, further comprising, upon detecting compromise of the second root certificate, invalidating and regenerating the first root certificate and the second root certificate.

20. The computer-implemented method of claim 18, further comprising generating, at the third node, an end-entity certificate that is signed by the intermediate certificate.

* * * * *